United States Patent
Nakamura (10) Patent No.: US 7,033,032 B2
(45) Date of Patent: Apr. 25, 2006

(54) PROJECTION DISPLAY SYSTEM INCLUDING A RELAY LENS THAT PREVENTS LIGHT REFLECTED AT A SURFACE THEREOF FROM BEING TRANSMITTED IN A PROJECTION DIRECTION OF THE PROJECTION DISPLAY SYSTEM

(75) Inventor: Hideki Nakamura, Oume (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/925,165

(22) Filed: Aug. 24, 2004

(65) Prior Publication Data

US 2005/0046810 A1    Mar. 3, 2005

(30) Foreign Application Priority Data

Aug. 27, 2003 (JP) .............................. 2003-303093
Feb. 13, 2004 (JP) .............................. 2004-036404

(51) Int. Cl.
  *G03B 21/20* (2006.01)
  *G03B 21/26* (2006.01)
(52) U.S. Cl. ........................................ 353/102; 353/30
(58) Field of Classification Search .................. 353/30, 353/31, 102
See application file for complete search history.

(56) References Cited

U.S. PATENT DOCUMENTS 6,464,375 B1 * 10/2002 Wada et al. ................ 362/268
2005/0180018 A1 * 8/2005 Yamanaka et al. .......... 359/619

FOREIGN PATENT DOCUMENTS

JP    2003-149599 A    5/2003

* cited by examiner

*Primary Examiner*—Melissa Jan Koval
(74) *Attorney, Agent, or Firm*—Frishauf, Holtz, Goodman & Chick, P.C.

(57) ABSTRACT

A projection display system includes a reflection display device, an optical member for projecting an illumination beam toward the reflection display device from a direction inclined relative to a front surface direction of the reflection display device, an optical member for projecting an image beam projected from the reflection display device a onto a projection surface, and a relay lens disposed on a front surface side of the reflection display device. The relay lens corrects the illumination beam into a parallel beam that enters the reflection display device, and causes the image beam from the reflection display device to enter the optical member for projecting the image beam, and causes a part of the illumination beam that is surface reflected on a surface thereof facing the optical member to be reflected in a direction other than the direction in which the image beam is projected by the projection system optical member.

23 Claims, 5 Drawing Sheets

PROJECTION DISPLAY SYSTEM INCLUDING A RELAY LENS THAT PREVENTS LIGHT REFLECTED AT A SURFACE THEREOF FROM BEING TRANSMITTED IN A PROJECTION DIRECTION OF THE PROJECTION DISPLAY SYSTEM

BACKGROUND OF THE INVENTION

1. Technical Field

The present invention relates to a projection display system utilizing a reflection display device.

2. Background Art

There exists a projection display system utilizing a reflection display device such as a reflection liquid crystal display device or a micromirror display device, generally referred to as DMD (digital micromirror display), in which a plurality of pixels are arranged in a matrix, whereby reflected light that has entered from a front surface of the device is controlled by the plurality of pixels so arranged so as to project forward an image beam. The projection display system includes the reflection display device, a light source system optical member for projecting an illumination beam toward the reflection display device from a direction inclined in one direction relative to a front surface direction of the reflection display device and a projection system optical member for projecting the illumination beam projected from the reflection display device onto a projecting surface such as a screen.

In this projection display system, an illumination beam from the light source system optical member including a light source portion is caused to enter the reflection display device from the direction inclined in one direction relative to the front surface direction of the reflection display device. Due to this, the luminance of a displayed image that is displayed by the reflection display device needs to uniform over the whole area of a display area where the plurality of pixels are arranged in the matrix, and the illumination beam from the light source system optical member needs to be corrected into a parallel beam before it is incident on the reflection display device.

To make this happen, the applicant for this subject patent application has already proposed and disclosed, as a Japanese Unexamined Patent Publication No. 2003-149599, the aforesaid projection display system in which a relay lens is disposed on a front surface side of the reflection display device for correcting the illumination beam that has entered from a front surface of the lens which faces the light source system optical member and the projection system optical member into a parallel beam which follows a direction inclined at a predetermined angle relative to the front surface direction of the reflection display device so as to be incident on the reflection display device and allowing the image beam projected from the reflection display device to be incident on the projection system optical member. This projection display system is such that the parallel beam which is free from irregular luminance is emitted to the reflection display device so as to form an image by a reflection beam from the reflection display device, so that the image beam from the reflection display device is projected on the projection surface by the projection system optical member.

SUMMARY OF THE INVENTION

In the projection display system in which the relay lens is disposed on the front surface side of the reflection display device, part of the illumination beam from the light source system optical member is surface reflected on a convex surface of the relay lens which faces the light source system optical member, and part of the surface reflected illumination beam that has been incident on the projection system optical member is projected on the projection surface together with the image beam that has exited from the reflection display device. This has caused a problem that irregular luminance and reduced contrast are caused in the image so projected on the projection surface.

The present invention was made in view of the situations, and an aspect thereof is to provide a projection display system utilizing a reflection display device which can project an image of high quality which is free from the irregular luminance and reduced contrast.

With a view to attaining the aspect, according to an aspect of the invention, there is provided a projection display system comprising a reflection display device having a plurality of pixels arranged in a matrix and adapted to project forward an image beam by controlling reflected light that has entered from a front surface of the reflection display device by the plurality of pixels so arranged, a light source system optical member for projecting an illumination beam toward the reflection display device from a direction inclined in one direction relative to the front surface direction of the reflection display device, a projection system optical member for projecting an image beam that has exited from the reflection display device on a projection surface and a relay lens disposed on a front surface side of the reflection display device for correcting the illumination beam that has entered from a surface which faces the light source system optical member and the projection system optical member into a parallel beam which follows a direction inclined at a predetermined angle relative to the front surface direction of the reflection display device so as to make the parallel beam so corrected enter the reflection display device, making an image beam that has exited from the reflection display device enter the projection system optical member and making part of the illumination beam from the light source system optical member that has been surface reflected on the surface which faces the light system optical member and the projection system optical member exit in directions other than the direction in which the image beam is projected by the projection system optical member.

In this projection display system, the projection system optical member is made up of a plurality of lenses, and the relay lens may only have to have a characteristic for making the beam that has been surface reflected on the surface thereof which faces the light source system optical member and the projection system optical member exit in a direction in which the beam does not enter an effective area of at least a lens of the plurality of lenses of the projection system optical member which is disposed nearest an exit end of the projection system optical member.

This relay lens preferably reflects part of the beam that has been surface reflected on the surface thereof which faces the light source system optical member and the projection system optical member which part is directed toward the projection system optical member at an angle at which the part of the beam is refracted by an entrance side lens of the projection system optical member in the direction in which the part of the beam does not enter the effective area of at least the lens of the exit side lenses of the projection system optical member which is disposed nearest the exit end of the projection system optical member.

Furthermore, the plurality of lenses which constitute the projection system optical member are preferably disposed in the interior of a lens barrel at least an inner circumferential surface of which has a light absorbing characteristic.

In addition, the relay lens comprises a meniscus lens which has a convex surface formed on one side and a concave surface formed on the other side thereof and is preferably disposed in such a manner that the convex surface is made to face the reflection display device, whereas the concave surface is made to face the light source system optical member and the projection system optical member.

Note that preferably an optical axis of the relay lens is aligned with an axis of the projection system optical member and is positioned perpendicularly in the vicinity of a center of a circumferential edge portion of the reflection display device.

Then, the convex surface and concave surface of the meniscus lens desirably have a curvature which allows the image beam that has exited from the reflection display device to enter the projection system optical member as a substantially parallel beam or a beam which is converged slightly.

Since the projection display system according to the invention has the relay lens disposed on the front surface side of the reflection display device, the illumination beam from the light source system optical member can be corrected into the parallel beam which follows the direction inclined at the predetermined angle relative to the front surface direction of the reflection display device or a diffused beam which is close to the parallel beam by the relay lens so as to make the parallel beam enter the reflection display device, then the reflection display device is made to display an image which is free from irregular luminance, and the illumination beam from the reflection display device can be projected on the projection surface.

Moreover, with the projection display system, the relay lens can make the part of the illumination beam from the light source system optical member which is surface reflected on the surface of the relay lens which faces the light source system optical member and the projection system optical member exit in directions other than the direction in which the image beam is projected by the projection system optical member. Owing to this, there is caused no case where the surface reflected beam is projected onto the projection surface by the projection system optical member, and consequently, a high-quality projected image can be displayed on the projection surface which is free from irregular luminance and reduced contrast.

In the projection display system of the invention, the relay lens may only have to have the characteristic for making the beam that has been surface reflected on the surface thereof which faces the light source system optical member and the projection system optical member exit in the direction in which the beam does not enter the effective area of at least the lens of the plurality of lenses of the projection system optical member which is disposed nearest the exit end of the projection system optical member, and by constructing the relay lens in that manner, the surface reflected beam by the relay lens can be prevented from being projected on the projection surface by the projection system optical member in an ensured fashion.

This relay lens preferably reflects part of the beam that has been surface reflected on the surface thereof which faces the light source system optical member and the projection system optical member which part is directed toward the projection system optical member at the angle at which the part of the beam is refracted by the entrance side lens of the projection system optical member in the direction in which the part of the beam does not enter the effective area of at least the lens of the exit side lenses of the projection system optical member which is disposed nearest the exit end of the projection system optical member, and by constructing the relay lens in that manner, the surface reflected beam by the relay lens can be prevented from being projected onto the projection surface by the projection system optical member in an ensured fashion.

Furthermore, the plurality of lenses which constitute the projection system optical member are preferably disposed in the interior of the lens barrel whose inner circumferential surface has the light absorbing characteristic, and according to the construction, most of the beam that is surface reflected on the surface of the relay lens which faces the light source system optical member and the projection system optical member so as to be made to enter the projection system optical member and which travels through the projection system optical member in the direction in which the beam does not enter the effective area of at least the lens of the lenses of the projection system optical member which is disposed nearest the exit end of the projection system optical member can be absorbed by the inner circumferential surface of the lens barrel, whereby the surface reflected beam by the relay lens can be prevented from being projected onto the projection surface by the projection system optical member in an ensured fashion.

In addition, the relay lens comprises the meniscus lens which has the convex surface formed on one side and the concave surface formed on the other side thereof and is preferably disposed in such a manner that the convex surface is made to face the reflection display device, whereas the concave surface is made to face the light source system optical member and the projection system optical member. According to this construction, the illumination beam from the light source system optical member can be corrected into the substantially parallel beam which follows the direction inclined at the predetermined angle relative to the front surface direction of the reflection display device so as to be made to enter the reflection display device, the illumination beam that has exited from the reflection display device can be made to enter the projection system optical member, and the part of the illumination beam from the light source system optical member that has been surface reflected on the concave surface which faces the light system optical member and the projection system optical member can be made to exit in directions other than the direction in which the illumination beam is projected by the projection system optical member.

In this case, the convex surface and concave surface of the meniscus lens desirably have a curvature which makes the beam that enters the reflection display device a beam which is close to a parallel beam and which makes the beam that exits the reflection display device enter the projection system optical member as the converged beam which is substantially close to a parallel beam, and according to this construction, the image beam can be projected onto the projection surface without any light loss at the projection system optical member.

DESCRIPTION OF PREFERRED EMBODIMENT

Figure 1:
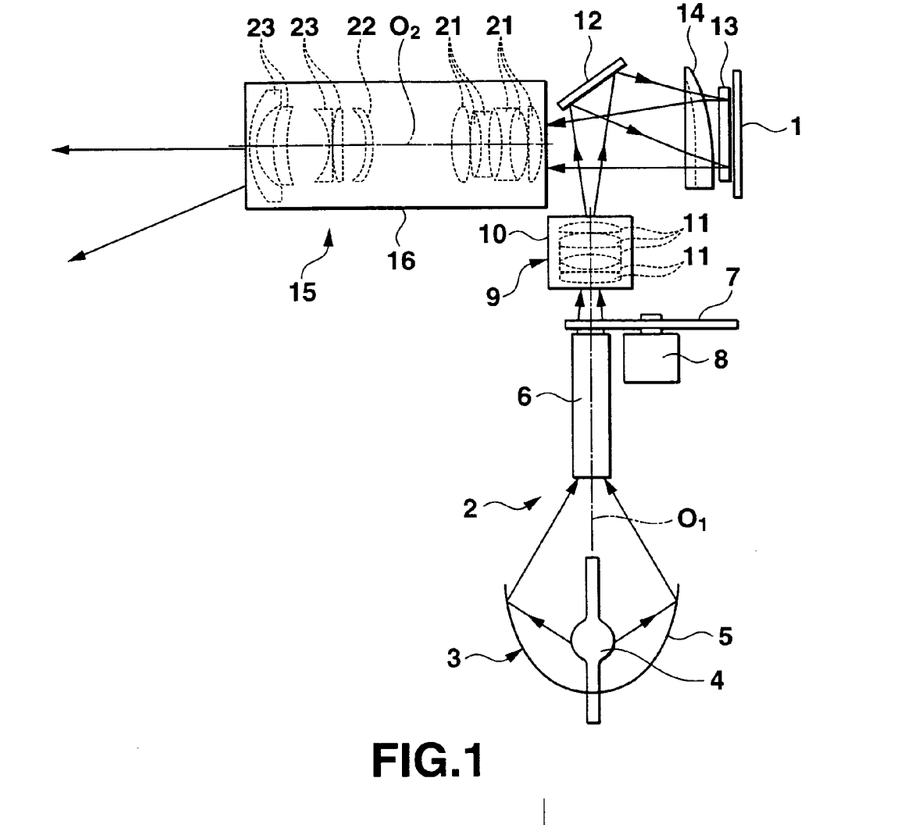
FIG. 1 is a plan view of a projection display system according to an embodiment of the invention.

FIGS. 1 to 6 show an embodiment of the invention, in which FIG. 1 is a plan view of a projection display system.

This projection display system includes a reflection display device 1 having a plurality of pixels (not shown) arranged in a matrix and adapted to project forward an image beam by controlling reflected light that has entered from a front surface of the reflection display device by the plurality of pixels so arranged, a light source system optical member 2 for projecting an illumination beam toward the reflection display device 1 from a direction inclined in one direction relative to the front surface direction of the reflection display device 1 (a direction near the normal of the front surface of the reflection display device 1), a projection system optical member 15 for projecting an image beam that has exited from the reflection display device 1 on a projection surface such as a screen, not shown, and a relay lens 4 disposed on a front surface side of the reflection display device 1.

In the projection display system of the embodiment, a micromirror display device is used for the reflection display device 1. Hereinafter, the reflection display device 1 is referred to as the micromirror display device.

While the construction thereof is not illustrated, the micromirror display device 1 is such that each pixel is constituted by an extremely thin metallic piece (for example, an aluminum piece) which is 10 μm to 20 μm long and wide and these micromirrors are inclined in one inclined direction and the other inclined direction by a mirror driving device which is formed of CMOS as a base for display of an image.

Namely, the micromirror display device 1 is such that a beam of light that has entered at an incident angle which is in a predetermined angular range from the incident direction which is inclined in the one inclined direction of the micromirrors relative to the front surface direction is reflected in the front surface direction and the inclined direction by switching the plurality of inclined directions of the micromirrors for display of an image. Namely, a beam that enters the micromirror which is inclined in the one inclined direction is reflected in the front surface direction by this micromirror, and another beam that enters the micromirror which is inclined in the other inclined direction is reflected in the inclined direction by the micromirror, whereby an image is displayed by a bright display by the reflected beam in the front surface direction and a dark display by the reflected beam in the inclined direction.

Note that the brightness of the bright display can be varied arbitrarily by controlling the time during which the micromirror is inclined in the one inclined direction (the inclined direction in which the incident light is reflected in the front surface direction). Consequently; an image having a gradation in brightness thereof can be displayed to the micromirror display device 1.

On the other hand, as shown in FIG. 1, the light source system optical member 2 includes a light source portion 3 for emitting an illumination beam, a light-guiding rod 6 disposed on an exit side of the light source portion 3, a color wheel 7 disposed on an exit end of the light-guiding rod 6, and a light source system lens unit 9 and a mirror 12 which are constructed to project an illumination beam that has exited from the light-guiding rod 6 and transmitted through the color wheel 7 toward a front surface of the micromirror display device 1. Then, in this light source system optical member 2, the mirror 12 is disposed diagonally forward of the micro mirror display device 1 so that the illumination beam is projected to the micromirror display device 1 in a direction inclined in one direction relative to the front surface direction thereof.

The light source portion 3 includes a light source lamp 4 such as a ultra-high-voltage mercury lamp which emits high-luminance white light and a reflector 5 for collecting and emitting forward an outgoing or exit light from the light source lamp 4.

In addition, the light-guiding rod 6 is made up of a transparent angular rod having a similar cross-sectional shape of the display area in which the plurality of pixels of the micromirror display device 1 is formed into a matrix or an angular tube in which a reflection film is provided over the entirety of an inner side thereof, and one end of the transparent angular rod is made to be an entrance end, whereas the other end thereof is made to be an exit end. Then, this light-guiding rod 6 is disposed on an exit side of the light source portion 3 with the entrance end thereof being made to face the light source portion 3 and a central axis of the rod being aligned with an exit optical axis $O_1$ of the light source portion 3.

The light-guiding rod 6 is provided for making an exit light from the light source portion 3 a beam having a uniform intensity distribution, and when a light that exits after having been collected from the light source portion 3 and then reflected by the reflector 5 is allowed to enter from the entrance end surface, the light-guiding rod 6 guides the light in a longitudinal direction thereof while totally reflecting the light on an interface between the respective side surfaces of the light-guiding rod 6 and a layer of air which is outside air, and the light so guided is then allowed to exit from the exit end face as abeam having a uniform intensity distribution.

In addition, the color wheel 7 is allowed to exit from the light source portion 3 and provided to color the illumination beam (the white beam) which is made the beam having the uniform intensity distribution by the light-guiding rod 6 to a plurality of colors, for example, three colors such as red, green and blue sequentially.

This color wheel 7 is made up of a disc-like rotating plate on which segment color filters of three colors such as red, green and blue are arranged in a circumferential direction. The center of the color wheel 7 is fixed to a rotating shaft of a wheel rotating motor 8 disposed sideways of the light-guiding rod 6, and the color wheel 7 is disposed in such a manner that the color filters of three colors such as red, green and blue pass through in front of the exit end of the light-guiding rod 6 sequentially when the color wheel 7 rotates.

In addition, the light source system lens unit 9 is a fixed focal point lens unit in which a plurality of lenses 11 are disposed in combination in the interior of a lens barrel 10 so as to reduce a lens aberration. This light source system lens unit 9 is disposed on an exit side of the color wheel 7 with optical axis of all the lenses being aligned with the exit optical axis $O_1$ of the light source portion 3.

Then, the light source portion 3, the light-guiding rod 6, the color wheel 7 and the light source system lens unit 9 are disposed sideways of the micromirror display device 1 with the exit end of the light source system lens unit 9 being made to face a forward region of the micromirror display device 1 and the exit optical axis $O_1$ of the light source portion 3 being made perpendicular relative to the front surface direction of the micromirror display device 1.

In addition, the mirror 12 is made up of a plane mirror and is provided to the side of the forward region of the micromirror display device 1 in such a manner as to face the exit end of the light source system lens unit 9 with the forward region being held therebetween and to be inclined obliquely at a predetermined angle relative to the exit optical axis $O_1$ of the light source portion 3. Namely, the mirror 12 is disposed so as to reflect a beam that exits from the light source system lens unit 9 toward the mircomirror display device 1 and to project the reflected beam toward the micromirror display device 1 in a direction inclined in one direction relative to the front surface direction of the micromirror display device 1.

On the other hand, a cover glass 13 for protecting the micromirror display device 1 is disposed in front thereof, and the relay lens 14 is disposed in front of the glass cover 13 so disposed.

The relay lens 14 is such as to correct the beam that has exited from the light source portion 3 of the light source system optical member 2 and which is incident thereon from a surface thereof which faces the light source system optical member 2 and the projection system optical member 15 into a substantially parallel beam which follows a direction inclined at a predetermined angle relative to the front surface of the micromirror display device 1 so as to make the corrected beam enter the micromirror display device 1. In addition, the relay lens 14 has a characteristic not only to collect image beams that have exited from the micromirror display device 1 so as to make the beams enter the projection system optical member 15 but also to make part of the illumination beam from the light source system optical member 2 which has been surface reflected on the surface of the relay lens 14 which faces the light source system optical member 2 exit in other directions than the direction in which the image beam is projected by the projection system optical member 15.

This relay lens 14 is made up of a meniscus lens in which one side is formed into a convex surface and the other side thereof is formed into a concave surface and is disposed with the convex surface thereof being made to face the micromirror display device 1, the concave surface thereof being made to face the light source system optical member 2 and the projection system optical member 15, and a lens center 14a thereof being made to face the vicinity of the center of an edge portion of a circumferential edge portion of the display area of the micromirror display device 1 which edge portion is situated on an opposite side to the entrance side where the illumination beam from the light source system optical member 2 enters. Hereinafter, the relay lens 14 is referred to as the meniscus lens.

Figures 2A, 2B:
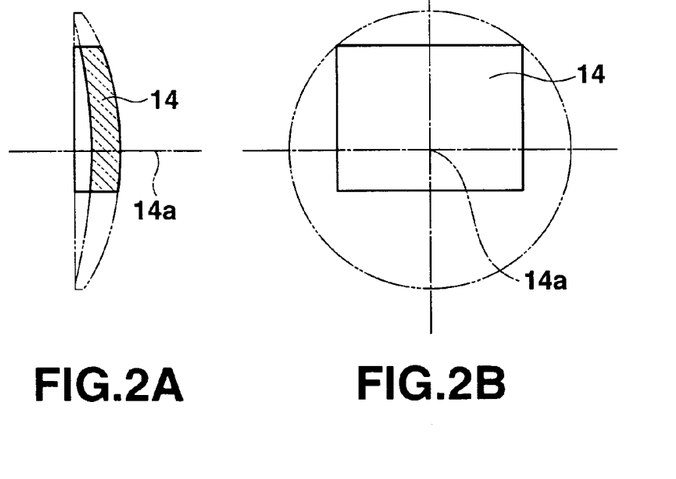
FIGS. 2A and 2B are an enlarged cross-sectional view and a front view of a relay lens disposed on a front surface side of a reflection display system.

FIGS. 2A and 2B are an enlarged cross-sectional view and a front view of the meniscus lens 14, respectively. The concave surface of the meniscus lens 14 is formed into a surface having a curvature which allows part of the illumination beam from the light source system optical member 2 which has been surface reflected on the concave surface to exit in other directions than the direction in which the image beam is projected by the projection system optical member 15. In addition, the convex surface of the meniscus lens 14 which faces the micromirror display device 1 is formed into a surface having a curvature which refracts, based on the curvature of the concave surface, the illumination beam projected from the light source system optical member 2 in a direction inclined at the predetermined angle relative to the front surface direction of the micromirror display device 1 by the concave surface and the convex surface so as to make the refracted beam enter the micromirror display device 1 as a substantially parallel beam and which refracts the image beam that has exited from the micromirror display device 1 in the front surface direction thereof by the convex surface and the concave surface so as to make the refracted beam enter the projection system optical member 15.

Note that an effective area of the meniscus lens 14 is a portion thereof which corresponds to the display area of the micromirror display device 1 or a portion indicated by solid lines in FIG. 2B, and since a portion indicated by inclined lines in FIG. 2A is a non-effective area, in this embodiment, as shown in FIG. 2B, the meniscus lens 14 is used in which the non-effective area is cut out.

In addition, the projection system optical member 15 is made up of a variable-focus lens unit in which a plurality of lenses 21, 22, 23 are combined and disposed within a lens barrel 16 in such a manner as to reduce a lens aberration, and the variable-focus lens unit is disposed in such a manner that optical axis $O_2$ of all the lenses are made substantially perpendicular relative to a normal of the front surface of the micromirror display device 1 so as to make the image beam that has exited from the micromirror display device 1 and which has transmitted through the meniscus lens 14 enter from the entrance end.

The projection display system is such that red, green and blue light beams from the light source system optical member 2 are projected sequentially onto the micromirror display device 1 by rotating the color wheel 7 of the light source system optical member 2 at high speed, and red, green and blue image data are sequentially sent to the micromirror dislay device 1 in synchronism with the projection cycle of the red, green and blue beams so as to control the driving of the micromirror display device 1, whereby red, green and blue images are allowed to be displayed sequentially onto the micromirror display device 1, so that red, green and blue single-color beams that exit sequentially from the micromirror display device 1 are projected onto the projection surface as an enlarged image by the projection system optical member 15, a full-color image being thereby displayed thereon in which three red, green and blue single-color images are viewed as overlapping one another.

Then, since, in the projection display system, the relay lens 14 made up of the meniscus lens is disposed in front of the micromirror display device 1, the illumination beam from the light source system optical member 2 can be corrected into the substantially parallel beam which follows the direction inclined at the predetermined angle relative to the front surface direction of the micromirror display device 1 so as to make the substantially parallel beam so corrected enter the mircomirror display device, so that the image free from irregular luminance is allowed to be displayed on the micromirror display device 1, thereby making it possible to project the image beam onto the projection surface by the projection system optical member 15.

Moreover, in this projection display system, since the relay lens 14 makes the part of the illumination beam from the light source system optical member 2 which has been surface reflected on the surface of the relay lens 14 which faces the light source system optical member 2 and the projection system optical member 15 exit in other directions than the direction in which the image beam is projected by the projection system optical member 15, there is caused no risk that the surface reflected beam is projected onto the projection surface by the projection system optical member 15. Consequently, a high-quality projection image can be projected on the projection surface which is free from irregular luminance and reduced contrast.

In this embodiment, since the meniscus lens 14, which has the convex surface formed on one side thereof and the concave surface formed on the other side thereof, is used for the relay lens 14, and is disposed such that the convex surface faces the micromirror display device 1 and the concave surface faces the light source system optical member 2 and the projection system optical member 15, the illumination beam from the light source system optical member 2 is corrected into the substantially parallel beam which follows the direction inclined at the predetermined angle relative to the surface direction of the micromirror display device 1 so as to make the substantially parallel beam so corrected enter the micromirror display device 1. Then, the relay lens 14 can make the image beam that has exited from the micromirror dislay device 1 enter the projection system optical member 15 and can also make the part of the illumination beam from the light source system optical member 2 which has been surface reflected on the concave surface which faces the light source system optical member 2 and the projection system optical member 15 exit in other directions than the direction in which the image beam is projected by the projection system optical member 15.

Hereinafter, the embodiment will be described in detail by reference to the drawings.

Figure 3A:
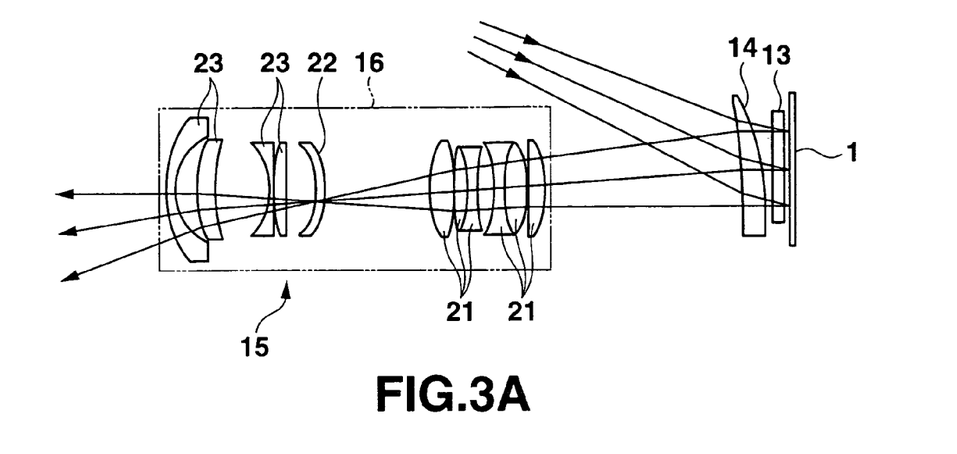
FIGS. 3A, 3B, 3C are exemplary views illustrating directions in which reflected beams by the reflection display device and surface reflected beams by the relay lens.
Figure 3B:
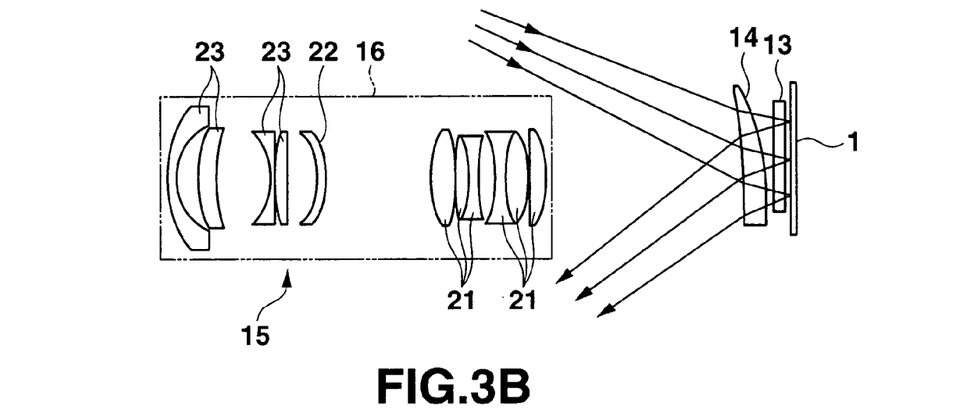
Figure 3C:
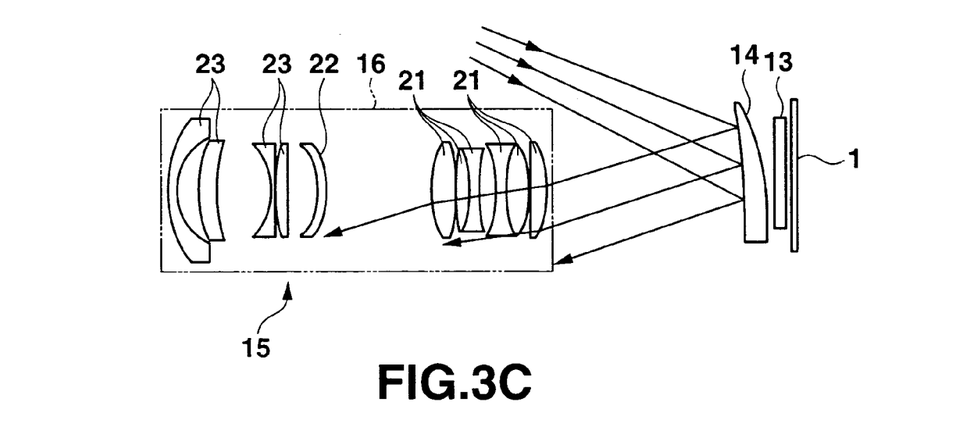
Figure 4:
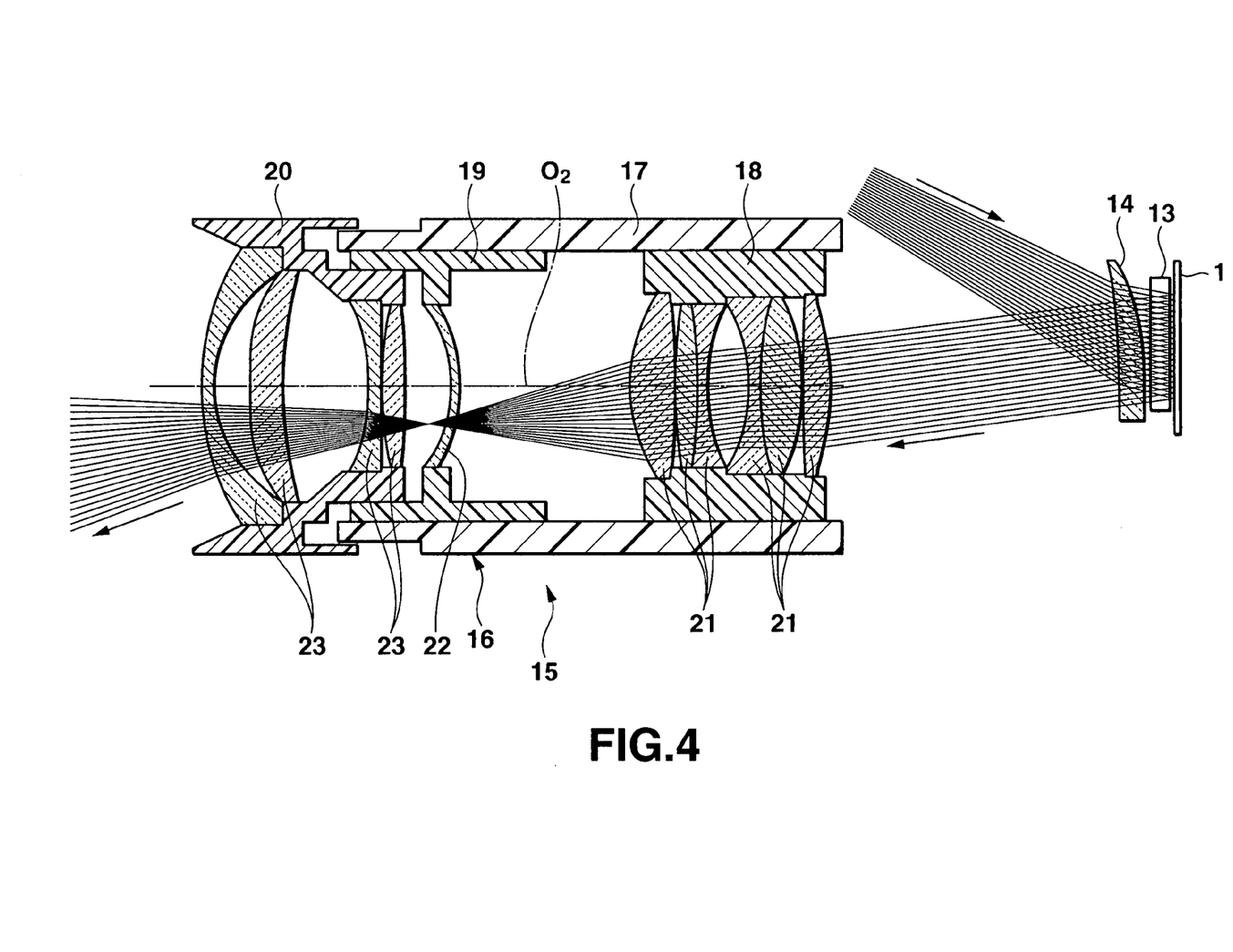
FIG. 4 is a detailed view of FIG. 3A.
Figure 5:
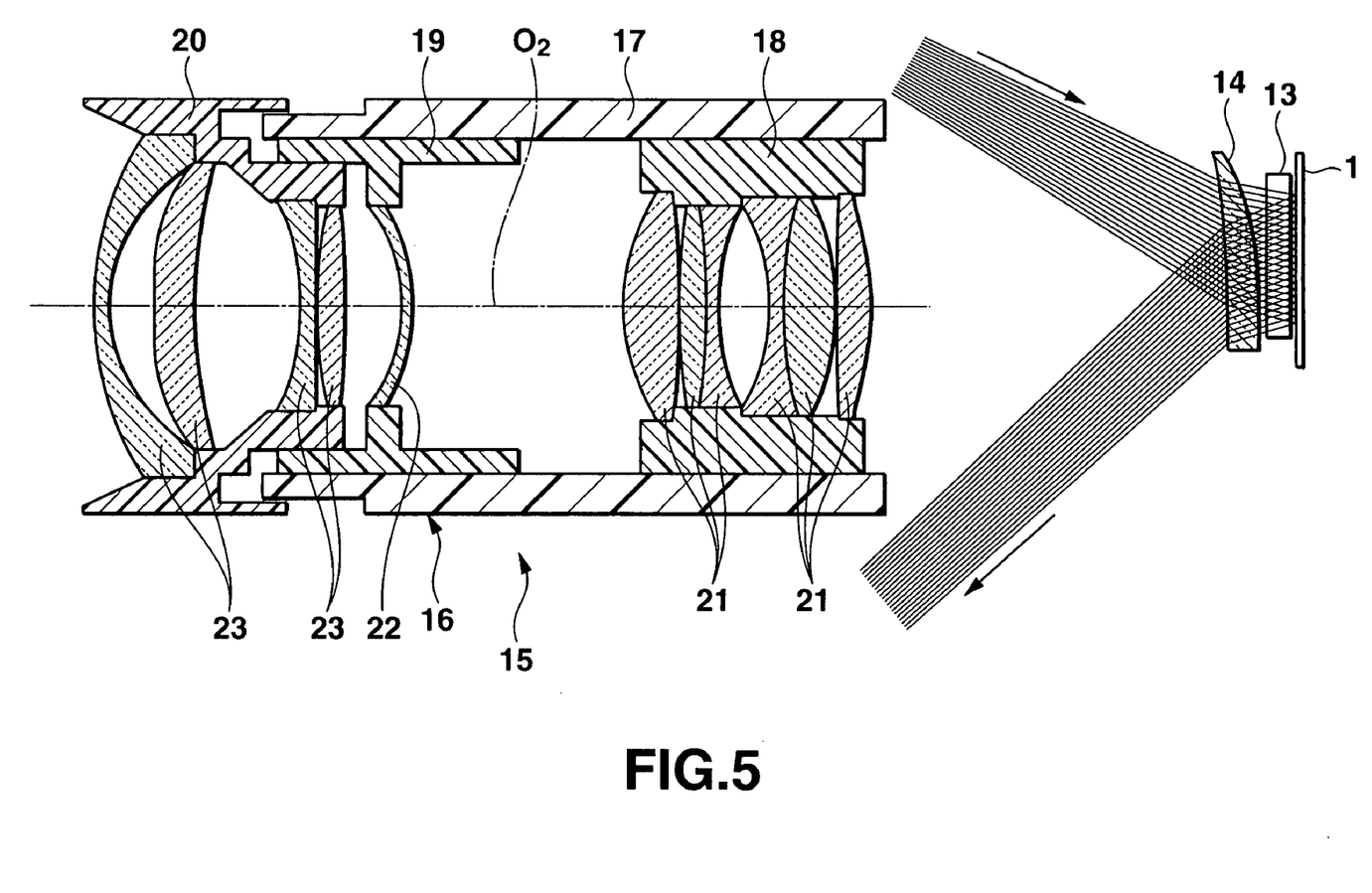
FIG. 5 is a detailed view of FIG. 3B.
Figure 6:
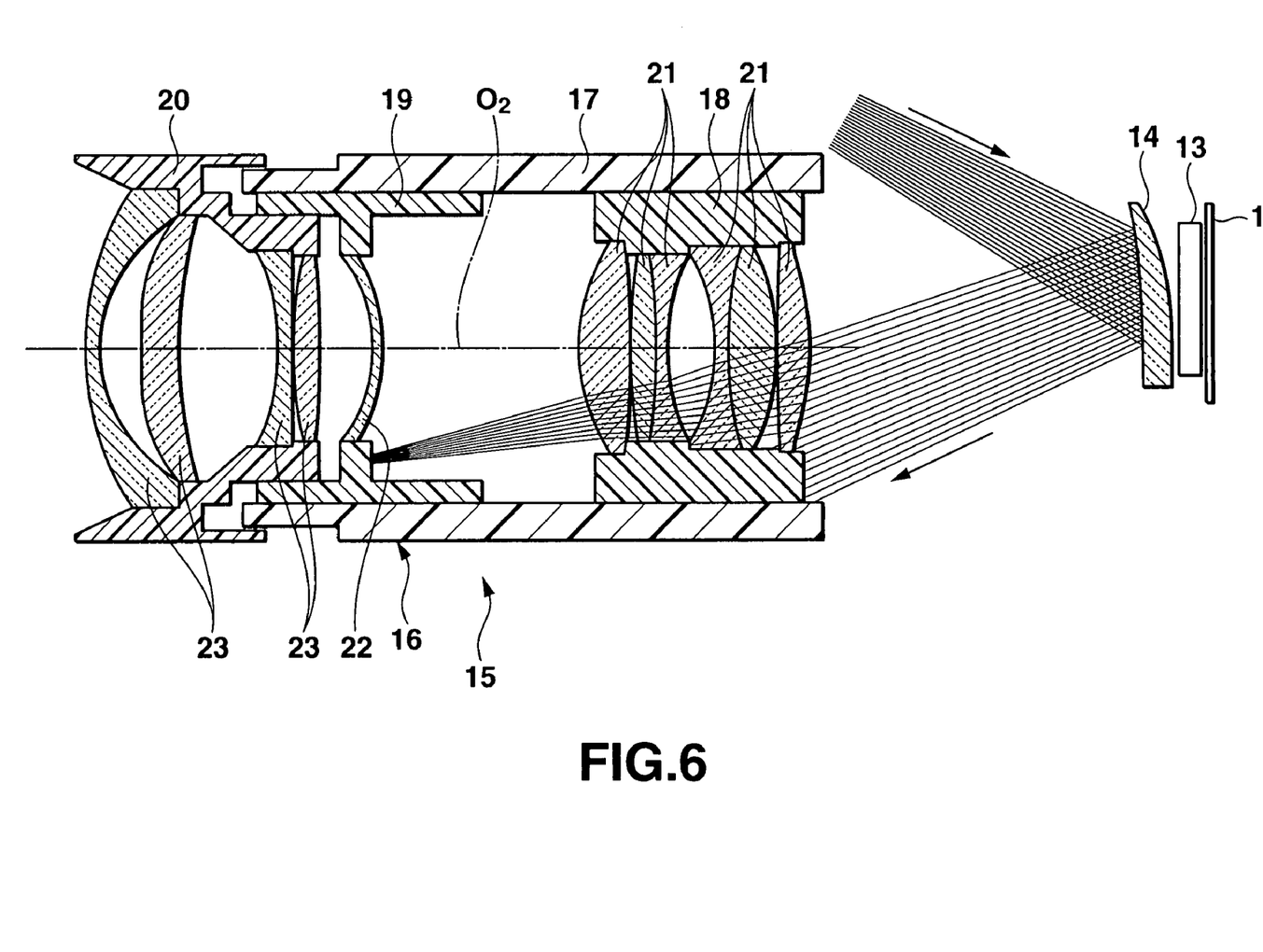
FIG. 6 is a detailed view of FIG. 3C.

FIGS. 3A to 3C are exemplary drawings illustrating outgoing or exit directions of reflected beams by the micromirror display device 1 and surface reflected beams by the meniscus lens 14, and FIGS. 4 to 6 are detailed drawings of FIGS. 3A to 3C, respectively. FIGS. 3A and 4 illustrate exit directions of beams reflected by the micromirros which are inclined in the one direction of the micromirror display device 1 in the front surface direction thereof, FIG. 3B and FIG. 5 illustrate exit directions of beams reflected by the mircromirrors inclined in the other inclined direction of the micromirror display device 1 in the inclined directions thereof, and FIGS. 3C and 6 illustrate exit directions of the surface reflected beams by the meniscus lens 14.

Firstly, to describe the projection system optical member 15, this projection system optical member 15 is such as to have a zooming function, and the lens barrel 16 thereof is made to face the meniscus lens 14 at an entrance end thereof and includes a fixed lens barrel 17 disposed in such a manner that an exit end thereof faces the projecting direction, an incident or entrance side movable lens barrel 18 provided movably within the fixed lens barrel 17 in a barrel length direction, a first exit side lens barrel 19 provided movably within the fixed lens barrel 17 in the barrel length direction, and a second exit side lens barrel 20 movably provided on an exit side of the first exit side movable lens barrel 19 in the barrel length direction.

The fixed lens barrel 17 and the movable lens barrels 18, 19, 20 are made up of molded products from black resin, and consequently, each of these lens barrels 17, 18, 19, 20 has a light absorbing property.

Then, a plurality of entrance side lenses 21 are provided in the incident side movable lens barrel 18, a single first exit side lens 22 is provided at an intermediate portion along the barrel length direction within the first exit side movable lens barrel 19, and a plurality of first exit side lenses 23 are provided within the second exit side lens barrel 20.

This projection system optical member 15 is such as to implement a zooming operation by moving the incident side movable lens barrel 18 and the first exit side movable lens barrel 19 in such a manner as to become closer to each other or to be separated away from each other and to perform a focusing operation by moving the second exit side movable lens barrel 20. Namely, the incident side movable lens barrel 18, the first exit side movable lens barrel 19 and the second exit side movable lens barrel 20 are each moved in the barrel length direction by a moving mechanism not shown.

In addition, the meniscus lens 14 disposed in front of the micromirror display device 1 has a curvature which allows the part of the illumination beam from the light source system optical member 2 which has been surface reflected on the concave surface thereof which faces the light source system optical member 2 and the projection system optical member 15 to exit in the direction in which the part of the beam does not enter the exit side lenses 22, 23 of the plurality of lenses 21, 22, 23 which constitute the projection system optical member 15.

Namely, the meniscus lens 14 has the characteristic to make part of the beam which has been surface reflected on the concave surface thereof which faces the light source system optical member 2 and the projection system optical member 15 which part is directed to the projection system optical member 15 exit at an angle at which the part of the surface reflected beam is refracted by the incident side lens 21 in a direction the part of the beam does not enter the exit side lenses 22, 23 of the projection system optical member 15.

Furthermore, the convex surface of the meniscus lens 14 which faces the micromirror display device 1 and the concave surface thereof which faces the light source system optical member 2 and the projection system optical member 15 each have a curvature which allows the image beam that has exited from the micromirror display device 1 to enter the projection system optical member 15 as a substantially parallel beam or a slightly converged beam.

Namely, of the beam that is corrected by the meniscus lens 14 into the substantially parallel or slightly diffused beam so as to be made to enter the micromirror display device 1, the image beam that exits from the micromirror display device 1 is the parallel beam that is reflected in the front surface direction by the micromirrors that are inclined in the one inclined direction or slightly diffused beam, and the convex surface and the concave surface of the meniscus lens 14 has the curvature which allows the image beam that has exited from the micromirror display device 1 to enter the projection system optical member 15 as the substantially parallel beam or slightly converged beam.

In the projection display system, since the meniscus lens 14 is disposed in front of the micromirror display device 1 and the mirror 12 of the light source system optical member 2 is disposed obliquely forward of the micromorror display device 1, the illumination beam projected from the light source system optical member 2 is corrected into the substantially parallel beam which follows the direction inclined at the predetermined angle relative to the front surface direction of the micromirror display device 1, and the substantially parallel beam so corrected is made to transmit through the cover glass 13 so as to enter the micromirorr display device 1.

Then, the image beam, which is the part of the beam reflected by the plurality of micromirrors of the micromirror display device 1 which is reflected in the front surface direction by the micromirrors which are inclined in the one inclined direction, transmits through the cover glass 13 again, and enters the projection system optical member 15 via the meniscus lens 14 so as to be projected onto the projection surface, as shown in FIGS. 3A and 4, whereas the beam reflected in the oblique direction by the micromirrors inclined in the other inclined direction transmits again the cover glass 13 and exits in an obliquely deviating direction from the projection system optical member 15 via the meniscus lens 14, as shown in FIGS. 3B and 5, so as to be absorbed by a light absorbing body, not shown.

In this embodiment, as has been described heretofore, since the convex surface and concave surface of the meniscus lens 14 are made to be surfaces having the curvature which allows the image beam that has exited from the micromirror display device 1 (the parallel beam that has been reflected by the micromirros inclined in the one inclined direction) to enter the projection system optical member 15 as the substantially parallel beam, the image beam can be projected onto the projection surface without being lost at the projection system optical member 15.

Namely, in the event that the image beam that has left the micromirror display device 1 and which is to enter the projection system optical member 15 via the meniscus lens 14 is made to enter the projection system optical member 15 as a light beam having a divergence or convergence angle of a certain magnitude relative to the substantially parallel beam that has exited the micromirror display device 1, part of the beam that has so entered is refracted in a direction which deviates from the projecting direction of the image beam by the incident side and exit side lenses 21, 22, 23 of the projection system optical member 15, and a certain light loss is caused due to the beam so refracted being absorbed by the inner circumferential surface of the lens barrel 16 of the projection system optical member 15. However, in the event that the image beam that exits from the micromirror display device 1 and enters the projection system optical member 15 via the meniscus lens 14 is the substantially parallel beam, the aforesaid illumination beam can be projected onto the projection surface without any light loss at the projection system optical member 15.

Note that since the image beam that has departed from the micromirror display device 1 is made to enter the projection system optical member 15 while being refracted to some extent, while it is difficult to correct the image beam which transmits through the meniscus lens 14 so as to enter the projection system optical member 15, in the event that the image beam which transmits through the meniscus lens 14 so as to enter the projection system optical member 15 is the substantially parallel beam or a beam close to a parallel beam, the aforesaid illumination beam can be projected onto the projection surface without any light loss at the projection system optical member 15.

Moreover, in this embodiment, since the curvature of the convex and concave surfaces of the meniscus lens 14 is set as has been described above, the beam which is reflected in the oblique direction by the micromirrors directed in the other inclined direction of the micromirror display device 1 can be made to exit while it remains substantially as a parallel beam, and consequently, the area of the light absorbing body, not shown, for absorbing the beam may remain small.

In addition, the entirety of the part of the illumination beam projected from the light source system optical member 12 which has been surface reflected by the concave surface of the meniscus lens 14 which faces the light source system optical member 2 and the projection system optical member 15 is made to exit in a direction deviating obliquely relative to the exit direction of the image beam which is reflected in the front surface direction of the micromirror display device 1 via the meniscus lens 14, as shown in FIGS. 3C and 6. Of the beam surface reflected on the concave surface of the meniscus lens 14, the beam that has entered the incident side end face of the lens barrel 16 of the projection system optical member 15, that is, the light that has entered the incident side end faces of the fixed lens barrel 17 and the incident side movable lens barrel 18 is absorbed by the end surfaces of both the fixed lens barrel 17 and the incident side movable lens 18. In addition, of the beam that has been surfaced reflected by the concave surface of the meniscus lens 14, the beam that has entered the lens barrel 16 is refracted by the plurality of incident side lens 21 within the incident side movable lens barrel 18 in a direction in which an angle relative to the lens optical axis $O_2$ increases to thereby be absorbed by the inner circumferential surface of the fixed lens barrel 17 and an inner circumferential surface of a portion of the fixed lens barrel 17 which is situated between the incident side movable lens barrel 18 and the first exit side movable lens barrel 19.

Note that of the beam that has been refracted by the incident side lenses 21 within the incident side movable lens barrel 18, the absorbing position of the beam that has departed from the departure end of the incident side movable lens barrel 18 varies in accordance with the zooming operation in which the incident side movable lens barrel 18 and the first exit side movable lens barrel 19 are moved to become closer to each other or become separate apart from each other, and when the incident side movable lens barrel 18 and the exit side movable lens barrel 19 are made to become closest to each other, the beam that has exited from the exit end of the incident side movable lens barrel 18 enters a lens support portion provided at an intermediate portion along the barrel length of the inner circumferential surface of the first exit side movable lens barrel 19 as shown in FIG. 6 in such a manner as to erect therefrom to thereby be absorbed thereat. Consequently, as the incident side movable lens barrel 18 is separated apart from the first exit side movable lens barrel 19, the beam that has exited from the exit end of the incident side movable lens barrel 18 enters the inner circumferential surface of the fixed lens barrel 17 closer to the incident end than the lens supporting portion of the first exit side movable lens 19 and the inner circumferential surface of the portion of the fixed lens barrel 17 which is situated between the incident side movable lens barrel 18 and the first exit side movable lens barrel 19 to thereby absorbed thereat.

Owing to this, according to the projection display system, there is caused no risk that the beam surface reflected on the concave surface of the meniscus lens 14 which faces the light source system optical member 2 and the projection system optical member 15 is projected onto the projection surface by the projection system optical member 15, and consequently, a high-quality projection image can be projected on the projection surface which is free from irregular luminance and reduced contrast.

In addition, in the projection display system, since the meniscus lens 14 disposed on the front surface side of the micromirror display device 1 has the characteristic to make the beam of the illumination beam from the light source system optical member 2 which is surface reflected by the concave surface of the meniscus lens 14 which faces the light source system optical member 2 and the projection system optical member 15 exit in the direction in which the beam does not enter the exit side lenses 22, 23 of the plurality of lenses 21, 22, 23 of the projection system optical member 15, the surface reflected beam by the meniscus lens 14 can be prevented from being projected onto the projection surface by the projection system optical member 15 in an ensured fashion.

As has been described above, the meniscus lens 14 preferably makes part of the beam that has been surface reflected by the surface thereof which faces the light source system optical member 2 and the projection system optical member 15 which part is directed toward the projection system optical member 15 exit at the angle at which the part of the beam is refracted by the incident side lens 21 of the projection system optical member 15 in the direction in which the same part does not enter the exit side lenses 22, 23 of the projection system optical member 15, and according to the construction, the surface reflected beam by the meniscus lens 14 can be prevented from being projected onto the projection surface by the projection system optical member 15 in an ensured fashion.

Furthermore, in the projection display system according to the embodiment, the plurality of lenses 21, 22, 23 which constitute the projection system optical member 15 are disposed within the lens barrel 16 having the light absorbing property which is made up of the fixed lens barrel 17 and the incident side movable lens barrel 18 and the first and second exit side movable lens barrels 19, 29 which are provided in the interior of the fixed lens barrel 17, the fixed lens barrel 17, the incident side movable lens barrel 18 and the first and second exit side movable lens barrel 19, 20 being all made up of molded products from black resin. Due to this, most of the beam that has been surface reflected by the concave surface of the meniscus lens 14 which faces the light source system optical member 2 and the projection system optical member 15, which is then made to enter the projection system optical member 15 and which then travels through the projection system optical member 15 toward the direction in which the beam does not enter the exit side lenses 22, 23 is absorbed by the inner circumferential surface of the lens barrel 16, thereby making it possible to ensure the prevention of projection of the surface reflected beam which is reflected by the meniscus lens 14 onto the projection surface by the projection system optical member 15.

Note that while, in the embodiment, the lens 23 disposed nearest the exit end of the projection system optical member 15 is described as constituting a lens having over the whole area thereof a lens function to project the incident light toward the projection surface, the lens 23 disposed nearest the exit end may be made up of a lens which has an effective area thereof, that is, an area having the lens function to project the incident light toward the projection surface on an area thereof excluding a circumferential portion, and the circumferential portion may not have the lens function. In this case, even in the event that part of the surface reflected beam by the meniscus lens 14 enters the circumferential portion of the lens 23 disposed nearest the exit end of the projection system optical member 15, the part of the beam is made to exit in directions other than the direction toward the projection surface.

Consequently, in the event that the effective area of the lens 23 disposed nearest the exit end of the projection system optical member 15 is constituted by the area of the lens excluding the circumferential portion thereof, the meniscus lens 14 may only have to have the characteristic for making the beam that has been surface reflected on the concave surface thereof which faces the light source system optical member 2 and the projection system optical member 15 exit in the direction in which the beam does not enter the effective area of at least the lens 23 of the projection system optical member 15 which is disposed nearest the exit end thereof, that is the characteristic for making part of the beam that has been surface reflected by the concave surface exit at the angle at which the part of the beam is refracted in the direction in which the part of the beam does not enter the effective area of the lens 23 disposed nearest the exit end of the projection system optical member by the incident lens 21 of the same optical system. According to the construction, it is possible to ensure the prevention of projection of the surface reflected beam that is reflected by the meniscus lens 14 onto the projection surface by the projection system optical member 15.

In addition, while, in the projection display system according to the embodiment, the lens barrel 16 of the projection system optical member 15 or the fixed lens barrel 17 and the incident side movable lens barrel 18 and the first and second exit side movable lens barrels 19, 20 which are provided in the interior of the fixed lens barrel 17 are made to be constituted by molded products from black resin, respectively, a light absorbing treatment may be applied to the inner circumferential surfaces of the lens barrels 17, 18, 19, 20 such as a light absorbing paint being applied to or a light absorbing material being planted in those barrels, provided that the inner circumferential surfaces are allowed to maintain the light absorbing property.

Furthermore, the lens barrel 16 may be constructed such that an annular stop wall for allowing image beams directed toward the projection surface to transmit therethrough but image beams directed toward other directions to be absorbed thereat is provided at a single or a plurality of locations on the inner circumferential surfaces of the incident side movable lens barrel 18 and the first and second exit side movable lens barrels 19, 20 and the inner circumferential surface of the portion of the fixed lens barrel 17 which is situated between the incident side movable lens barrel 18 and the first exit side movable lens barrel 19.

Note that while, in the aforesaid embodiment, the relay lens 14 constituted by the meniscus lens is disposed on the front surface side of the micromirror display device 1, the relay lens that is disposed on the front surface side of the micromirror display device 1 may be constituted by, for example, a planoconvex lens which is formed into a flat surface on a side thereof which faces the light source system optical member 2 and the projection system optical member 15 and is formed into a convex surface on a side thereof which faces the reflection display device, provided that the planoconvex lens corrects the illumination beam that has entered from the surface which faces the light source system optical member 2 and the projection system optical member 15 into the parallel beam which follows the direction inclined at the predetermined angle relative to the front surface direction of the reflection display device so as to make the parallel beam so corrected enter the reflection display device 1, makes the image beam that has exited from the reflection display device 1 enter the projection system optical member 15 and makes part of the illumination beam from the light source system optical member 2 that has been surface reflected on the surface which faces the light system optical member 2 15 exit in directions other than the direction in which the image beam is projected by the projection system optical member 15.

In addition, while, in the embodiment, the light source system optical member 2 is constructed such that the illumination beam that is projected from the light source portion 3 and which is then made to transmit through the light-guiding rod 6, the color wheel 7 and the light source system lens unit 19 so as to be reflected by the mirror 12 to be thereby allowed to enter the micromirror display device 1, the light source system optical member 2 may be constructed such that the illumination beam that is projected from the light source portion 3 and which is then made to transmit through the light-guiding rod 6, the color wheel 7 and the light source system lens unit 19 is projected directly onto the micromirror display device 1.

Furthermore, while, in the embodiment, the color wheel 7 of the light source system optical member 2 is disposed on the exit end of the light-guiding rod 6, the color wheel 7 may be disposed at any other position, provided that the position where the color wheel 7 is disposed is situated within an optical path extending from the light source portion 3 to the entrance side of the projection system optical member 15.

In addition, while, in the embodiment, the cover glass 13 is disposed in front of the micromirror display device 1 and the relay lens 14 is disposed in front of the cover glass 13 so disposed, the cover glass 13 may be omitted.

Furthermore, while, in the embodiment, the micromirror display device is used as the reflection display device, the reflection display device is not limited to the micromirror display device and for example, a reflection liquid crystal display device (an active matrix liquid crystal display device or a simple matrix liquid crystal display device) may be used which is provided a reflection membrane on a rear side thereof, provided that the display device has a plurality of pixels which are arranged in a matrix, whereby the reflection of a light that has entered from the front surface of the device is controlled by the plurality of pixels so arranged so as to project an image beam forward.

In this case, the reflection liquid crystal display device is preferably constructed such that a beam that has entered from an incident direction inclined in one direction relative to the front direction thereof and which is then made to transmit a liquid crystal layer so as to be reflected on the reflection membrane is refracted by a prism or the like so as to be made to depart in the front direction.

In addition, when the reflection liquid crystal display device is used, the liquid crystal device may be a color display device provided with a color filter having a plurality of or three colors such as red, green and blue, and in the event that the color display device is used, the color wheel 7 of the light source system optical member may be omitted, whereby a white illumination beam is constructed so as to be projected from the light source system optical member 2 onto the color display device at all times.

The invention claimed is:

1. A projection display system comprising:
   a reflection display device which includes a plurality of pixels arranged in a matrix and which is adapted to project forward an image beam by controlling reflected light that is reflected by the plurality of pixels after entering the reflection display device from a front surface thereof;
   a light source system optical member for projecting an illumination beam toward the reflection display device from a direction inclined with respect to a front surface direction that is perpendicular to the front surface of the reflection display device;
   a projection system optical member for projecting the image beam projected from the reflection display device onto a projection surface; and
   a relay lens disposed on a front surface side of the reflection display device for: (i) correcting the illumination beam, which enters the relay lens from a surface thereof facing the light source system optical member and the projection system optical member, into a parallel beam which follows a direction inclined at a predetermined angle relative to the front surface direction of the reflection display device so that the parallel beam enters the reflection display device, (ii) causing the image beam projected from the reflection display device to enter the projection system optical member, and (iii) causing a part of the illumination beam from the light source system optical member that is surface reflected at the surface of the relay lens facing the light system optical member and the projection system optical member to be reflected in a direction other than a direction in which the image beam is projected by the projection system optical member.

2. A projection display system as set forth in claim 1, wherein the projection system optical member comprises a plurality of lenses, and the relay lens causes the surface reflected part of the illumination beam to be reflected in a direction in which the surface reflected beam does not enter an effective area of at least one lens of the plurality of lenses of the projection system optical member which is disposed nearest an exit end of the projection system optical member.

3. A projection display system as set forth in claim 2, wherein the relay lens causes a part of the surface reflected beam that is directed toward the projection system optical member exit to be reflected at an angle at which the part of the beam is refracted by an entrance side lens of the projection system optical member in the direction in which the part of the beam does not enter the effective area of the at least one lens nearest the exit end of the projection system optical member.

4. A projection display system as set forth in claim 2, wherein the plurality of lenses of the projection system optical member are disposed in an interior of a lens barrel having a light absorbing characteristic on at least an inner circumferential surface thereof.

5. A projection display system as set forth in claim 3, wherein the plurality of lenses of the projection system optical member are disposed in an interior of a lens barrel having a light absorbing characteristic on at least an inner circumferential surface thereof.

6. A projection display system as set forth in claim 1, wherein the relay lens comprises a meniscus lens which has a convex surface formed on a first side and a concave surface formed on a second side thereof and which is disposed such that the convex surface faces the reflection display device and the concave surface faces the light source system optical member and the projection system optical member.

7. A projection display system as set forth in claim 2, wherein the relay lens comprises a meniscus lens which has a convex surface formed on a first side and a concave surface formed on a second side thereof and which is disposed such that the convex surface faces the reflection display device the concave surface faces the light source system optical member and the projection system optical member.

8. A projection display system as set forth in claim 4, wherein the relay lens comprises a meniscus lens which has a convex surface formed on a first side and a concave surface formed on a second side thereof and which is disposed such that the convex surface faces the reflection display device and the concave surface faces the light source system optical member and the projection system optical member.

9. A projection display system as set forth in claim 6, wherein the convex surface and concave surface of the meniscus lens have a curvature which allows the image beam projected from the reflection display device to enter the projection system optical member as one of a substantially parallel beam and a beam which is converged slightly.

10. A projection display system as set forth in claim 7, wherein the convex surface and concave surface of the meniscus lens have a curvature which allows the image beam projected from the reflection display device to enter the projection system optical member as one of a substantially parallel beam and a beam which is converged slightly.

11. A projection display system as set forth in claim 8, wherein the convex surface and concave surface of the meniscus lens have a curvature which allows the image beam projected from the reflection display device to enter the projection system optical member as one of a substantially parallel beam and a beam which is converged slightly.

12. A projection display system as set forth in claim 1, wherein the relay lens comprises a planoconvex lens having a flat surface on a first side thereof and a convex surface on a second side thereof and which is disposed such that the convex surface faces the reflection display device and the flat surface faces the light source system optical member and the projection system optical member.

13. A projection display system as set forth in claim 2, wherein the relay lens comprises a planoconvex lens having a flat surface on a first side thereof and a convex surface on a second side thereof and which is disposed such that the convex surface faces the reflection display device and the flat surface faces the light source system optical member and the projection system optical member.

14. A projection display system as set forth in claim 4, wherein the relay lens comprises a planoconvex lens having a flat surface on a first side thereof and a convex surface on a second side thereof and which is disposed such that the convex surface faces the reflection display device and the flat surface faces the light source system optical member and the projection system optical member.

15. A projection display system as set forth in claim 12, wherein the convex surface and the flat surface of the planoconvex lens have a curvature which allows the image beam projected from the reflection display device to enter the projection system optical member as one of a substantially parallel beam and a beam which is converged slightly.

16. A projection display system as set forth in claim 13, wherein the convex surface and the flat surface of the planoconvex lens have a curvature which allows the image beam projected from the reflection display device to enter the projection system optical member as one of a substantially parallel beam and a beam which is converged slightly.

17. A projection display system as set forth in claim 14, wherein the convex surface and the flat surface of the planoconvex lens have a curvature which allows the image beam projected from the reflection display device to enter the projection system optical member as one of a substantially parallel beam and a beam which is converged slightly.

18. A projection display system as set forth in claim 6, wherein an optical axis of the relay lens is aligned with an optical axis of the projection system optical member and is aligned with a normal of the reflection display device that is positioned in a vicinity of a center of an edge portion at one of four sides of a display area of the reflection display device, said edge portion of the display area being situated opposite to an edge portion of an entrance side of the relay lens where the illumination beam from the light source system optical member enters obliquely.

19. A projection display system as set forth in claim 7, wherein an optical axis of the relay lens is aligned with an optical axis of the projection system optical member and is aligned with a normal of the reflection display device that is positioned in a vicinity of a center of an edge portion at one of four sides of a display area of the reflection display device, said edge portion of the display area being situated opposite to an edge portion of an entrance side of the relay lens where the illumination beam from the light source system optical member enters obliquely.

20. A projection display system as set forth in claim 8, wherein an optical axis of the relay lens is aligned with an optical axis of the projection system optical member and is aligned with a normal of the reflection display device that is positioned in a vicinity of a center of an edge portion at one of four sides of a display area of the reflection display device, said edge portion of the display area being situated opposite to an edge portion of an entrance side of the relay lens where the illumination beam from the light source system optical member enters obliquely.

21. A projection display system as set forth in claim 12, wherein an optical axis of the relay lens is aligned with an optical axis of the projection system optical member and is aligned with a normal of the reflection display device that is positioned in a vicinity of a center of an edge portion at one of four sides of a display area of the reflection display device, said edge portion of the display area being situated opposite to the an edge portion of an entrance side of the relay lens where the illumination beam from the light source system optical member enters obliquely.

22. A projection display system as set forth in claim 13, wherein an optical axis of the relay lens is aligned with an optical axis of the projection system optical member and is aligned with a normal of the reflection display device that is positioned in a vicinity of a center of an edge portion at one of four sides of a display area of the reflection display device, said edge portion of the display area being situated opposite to an edge portion of an entrance side of the relay lens where the illumination beam from the light source system optical member enters obliquely.

23. A projection display system as set forth in claim 14, wherein an optical axis of the relay lens is aligned with an optical axis of the projection system optical member and is aligned with a normal of the reflection display device that is positioned in a vicinity of a center of an edge portion at one of four sides of a display area of the reflection display device, said edge portion of the display area being situated opposite to an edge portion of an entrance side of the relay lens where the illumination beam from the light source system optical member enters obliquely.

* * * * *